(12) United States Patent
Cochran (10) Patent No.: US 6,251,257 B1
(45) Date of Patent: Jun. 26, 2001

(54) APPARATUS AND METHOD FOR ELECTROCHEMICALLY ETCHING GROOVES IN AN OUTER SURFACE OF A SHAFT

(75) Inventor: Dustin A. Cochran, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/441,153

(22) Filed: Nov. 12, 1999

Related U.S. Application Data (63) Continuation-in-part of application No. 09/326,443, filed on Jun. 4, 1999.
(60) Provisional application No. 60/117,794, filed on Jan. 29, 1999.

(51) Int. Cl.[7] ....................................... B23H 3/00
(52) U.S. Cl. ..................... 205/640; 204/272; 204/286; 204/290.01; 204/224 M
(58) Field of Search .................. 204/272, 280, 204/290.01, 224 M, 286; 205/640

(56) References Cited

U.S. PATENT DOCUMENTS

| 4,690,737 | * | 9/1987 | Vishnitsky | 204/129.7 |
| 5,758,421 | * | 6/1998 | Asada | 29/898.02 |
| 5,878,495 | * | 3/1999 | Martens et al. | 29/898.057 |
| 5,914,832 | * | 6/1999 | Teshima | 360/98.07 |

* cited by examiner

*Primary Examiner*—Kathryn Gorgos
*Assistant Examiner*—Thomas H. Parsons
(74) *Attorney, Agent, or Firm*—Thomason, Moser & Patterson, LLP (57) ABSTRACT

The present invention is directed to an apparatus 245 and method of etching grooves 235 in a shaft 175. In one embodiment, a cathode 250 is provided for electrochemically etching grooves 235 in an outer surface 215 of the shaft 175 to form a fluid dynamic journal bearing 225. The cathode 250 includes an electrically conductive cylindrical substrate 270 having an inner surface 275 that corresponds to the outer surface 215 of the shaft 175, the inner surface 275 having raised lands 280 corresponding to areas in which the grooves 235 are to be formed. A layer of electrically insulating material 285 covers the inner surface 275 of the substrate 270 between the lands 280 to preclude etching of the shaft 175 in areas between the lands. Preferably, the lands 280 are arranged so that the grooves 235 etched in the shaft 175 form one or more fluid dynamic bearings. In another aspect, the invention provides a process for electrochemically etching grooves 235 in the outer surface 215 of the shaft 175 to form a fluid dynamic bearing.

20 Claims, 5 Drawing Sheets

APPARATUS AND METHOD FOR ELECTROCHEMICALLY ETCHING GROOVES IN AN OUTER SURFACE OF A SHAFT

CROSS REFERENCE TO RELATED APPLICATIONS

This application is a continuation-in-part of "Electrode Design for Electrochemical Machining of Grooves" by MacLeod et al., U.S. application Ser. No. 09/326,443, filed Jun. 4, 1999, still pending and claims priority from U.S. Provisional patent application Ser. No. 60/117,794 filed Jan. 29, 1999.

BACKGROUND OF THE INVENTION

1. Field of the Invention

This invention pertains generally to the field of electrochemically etching grooves in an outer surface of a shaft, and more particularly to etching grooves in a shaft used in a spindle motor of a disk drive to form one or more fluid dynamic bearings.

2. Description of the Related Art

Disc drives, including magnetic disc drives, optical disc drives and magneto-optical disc drives, are widely used for storing information. A typical disc drive has one or more discs or platters which are affixed to a spindle and rotated at high speed past a read/write head suspended above the discs on an actuator arm. The spindle is turned by a spindle drive motor. The motor generally includes a shaft having a thrust plate on one end, and a rotating hub having a sleeve and a recess into which the shaft with the thrust plate is inserted. Magnets on the hub interact with a stator to cause rotation of the hub relative to the shaft.

In the past, conventional spindle motors frequently used conventional ball bearings between the hub and the shaft and the thrust plate. However, over the years the demand for increased storage capacity and smaller disc drives has led to the read/write head being placed increasingly close to the disc. Currently, read/write heads are often suspended no more than a few millionths of an inch above the disc. This proximity requires that the disc rotate substantially in a single plane. Even a slight wobble or run-out in disc rotation can cause the disc to strike the read/write head, damaging the disc drive and resulting in loss of data. Because this rotational accuracy cannot be achieved using ball bearings, the latest generation of disc drives utilize a spindle motor having fluid dynamic bearings on the shaft and the thrust-plate.

In a fluid dynamic bearing, a lubricating fluid such as gas or a liquid or air provides a bearing surface between a fixed member and a rotating member of the disc drive. Dynamic pressure-generating groove formed on a surface of the fixed member or the rotating member generates a localized area of high pressure or a dynamic cushion that enables the spindle to rotate with a high degree of accuracy. Typical lubricants include oil and ferromagnetic fluids. Fluid dynamic bearings spread the bearing interface over a large continuous surface area in comparison with a ball bearing assembly, which comprises a series of point interfaces. This is desirable because the increased bearing surface reduces wobble or run-out between the rotating and fixed members. Further, improved shock resistance and ruggedness is achieved with a fluid dynamic bearing. Also, the use of fluid in the interface area imparts damping effects to the bearing which helps to reduce non-repeat runout.

One generally known method for producing the dynamic pressure generating grooves is described in U.S. Pat. No. 5,758,421, to Asada, (ASADA), hereby incorporated by reference. ASADA teaches a method of forming grooves by pressing and rolling a ball over the surface of a workpiece to-form a groove therein. The diameter of the ball is typically about 1 mm, and it is made of a material such as carbide which is harder than that of the workpiece. This approach and the resulting fluid dynamic bearing, while a tremendous improvement over spindle motors using a ball bearing, is not completely satisfactory. One problem with the above method is the displacement of material in the workpiece, resulting in ridges or spikes, along the edges of the grooves. Removing these ridges, for example by polishing or deburring, is often a time consuming and therefore a costly process. Moreover, to avoid lowering yields great care must be taken not to damage the surface of the workpiece.

A further problem with the above method is due to a recent trend in disc drives toward higher rotational speeds to reduce access time, that is the time it takes to read or write data to a particular point on the disc. Disc drives now commonly rotate at speeds in excess of 7,000 revolutions per minute. These higher speeds require the shaft and the hub to be made of harder material. Whereas, in the past, one or more of the shaft, the sleeve or the hub could be made of a softer material, for example brass or aluminum, now all of these components must frequently be made out of a harder metal such as, for example, steel, stainless steel or an alloy thereof. These metals are as hard or harder than the material of the ball bearing. Thus, the above method simply will not work to manufacture fluid dynamic bearings for the latest generation of disc drives.

Another method for producing the grooves of a fluid dynamic bearing is described in U.S. Pat. No. 5,878,495, to Martens et al. (MARTENS), hereby incorporated by reference. MARTENS teach a method of forming dynamic pressure-generating grooves using an apparatus, such as a lathe, having a metal-removing tool and a fixture that moves the workpiece incrementally in the direction in which a pattern of grooves is to be formed. The metal-removing tool forms the grooves by carrying out a short chiseling movement each time the workpiece is moved. This approach, while an improvement over the earlier one in that it does not produce ridges that must be removed, is also not completely satisfactory. For one thing, this approach like that taught by ASADA is typically not suitable for use with harder metals, which in addition to being more difficult to machine are often brittle and can be damaged by the chiseling action. Moreover, because each groove or portion of a groove must be individually formed and the workpiece then moved, the process tends to be very time consuming and therefore costly. Furthermore, the equipment necessary for this approach is itself expensive and the metal-removing tool is subject to wear and requires frequent replacement.

A final method for producing the grooves involves a conventional etching process as described in U.S. Pat. No. 5,914,832, to Teshima (TESHIMA), hereby incorporated by reference. TESHIMA teaches a process in which the workpiece is covered with a patterned etch resistant coating prior to etching so that only the exposed portions of the workpiece are etched. While this approach avoids many of the problems of the previously described methods, namely the formation of ridges around the grooves and the inability to form grooves in hard metal, it creates other problems and therefore is also not wholly satisfactory. One problem is the time consumed in applying and patterning the etch resistant coat. This is particularly a problem where, as in TESHIMA, the resist coat must be baked prior to patterning or etching. Another problem is that the coating must be removed after etching. This is frequently a difficult task, and one that if not done correctly can leave resist material on the workpiece surface resulting in the failure of the bearing and destruction of the disc drive. Yet another problem with this approach is that each of the steps of the process requires the extensive use of environmentally hazardous and often toxic chemicals including photoresists, developers, solvents and strong acids.

Accordingly, there is a need for an apparatus and method for forming grooves in a workpiece made of a hard metal to manufacture fluid dynamic bearings suitable for use in a disc drive. It is desirable that the apparatus and method that allows the grooves to formed quickly and cheaply. It is also desirable that the apparatus and method not require expensive equipment or the use of a metal-removing tool that must be frequently replaced. It is further desirable that the apparatus and method not use an etch resistant material during manufacture that could contaminate the workpiece leading to the failure of the bearing and destruction of the disc drive.

The present invention provides a solution to these and other problems, and offers other advantages over the prior art.

SUMMARY OF THE INVENTION

The present invention relates to a method and apparatus for electrochemically etching grooves in an inner surface of a shaft to form a fluid dynamic bearing that solves these problems.

In accordance with one embodiment, a cathode is provided having an electrically conductive cylindrical substrate with an inner surface that corresponds to the outer surface of the shaft, the inner surface having a number of raised lands corresponding to the grooves to be formed in the shaft. The substrate can be made of aluminum, brass, chromium, copper, nickel, steel, stainless steel, tin, zinc or alloys thereof. Preferably, the substrate is stainless steel. More preferably, the stainless steel is T-303 stainless steel or T-316 stainless steel. A layer of electrically insulating material covers the inner surface of the substrate between the lands to substantially preclude etching of the outer surface of the shaft in areas corresponding to areas between the lands. The layer of electrically insulating material can include an organic polymer bonded to the inner surface of the substrate, and typically has a thickness sufficient to form a substantially smooth surface with the lands. In one version, the organic polymer comprises an adhesive, such as an epoxy resin. The lands can be shaped and arranged on the outer surface of the substrate to etch a pattern of herringbone, arcuate or sinusoidal grooves in the inner surface of the shaft. In one version of this embodiment, the lands are arranged on the inner surface of the substrate to etch the pattern of grooves about a circumference of the shaft. Preferably, the lands are arranged on the inner surface of the substrate so that the pattern of grooves etched in the outer surface of the shaft form one or more fluid dynamic bearings.

In another aspect, the present invention is directed to a process of electrochemically etching grooves in an outer surface of an electrically conductive shaft to form a fluid dynamic bearing. In the process, a cathode is provided and the shaft and the cathode are held with a fixture adapted to hold the shaft within the cathode so that there is substantially no contact between the cathode and inner surface of the shaft. An electrolyte is then allowed to flow between the cathode and the shaft. The electrolyte can include one or more of water, acid, $NaNO_3$ or mixtures thereof. Next, the cathode and the shaft are coupled to an electrical current supply so that an electrical current is passed between the cathode and the shaft to remove material from the inner surface of the shaft. This can be accomplished, for example, by coupling the cathode to a negative terminal of the electrical current supply and coupling the shaft to the positive terminal. Preferably, at least 10 $A/cm^2$ is passed between the lands and areas of the shaft juxtaposed thereto. More preferably, less than 0.1 $A/cm^2$ is passed between the electrically insulating layer and areas of the shaft juxtaposed thereto.

In yet another aspect, the present invention is directed to an apparatus for electrochemically etching grooves in an outer surface of an electrically conductive shaft. The apparatus includes a cathode having an electrically conductive substrate with an inner surface that corresponds to the outer surface of the shaft. The inner surface includes a number of raised lands and a layer of electrically insulating material between the lands. A fixture holds the shaft within the cathode so that there is substantially no contact between the cathode and outer surface of the shaft. Generally, the fixture comprises an electrically insulating body. A sealed electrolyte flow-path is provided to flow an electrolyte between the cathode and the shaft. The flow-path can be adapted to flow a sufficient volume of electrolyte to remove material etched from the shaft. An electrical current supply passes electrical current between the cathode and the shaft so that material is removed from the outer surface of the shaft in areas corresponding to the raised lands. In one preferred embodiment, the lands are arranged on the inner surface of the substrate to etch a herringbone, an arcuate or a sinusoidal pattern of grooves in the shaft. More preferably, the lands are arranged to etch the pattern of grooves about a circumference of the shaft. Most preferably, the lands are arranged so that the pattern of grooves etched in the outer surface of the shaft form one or more fluid dynamic bearings.

In still another aspect, the present invention is directed to an apparatus having a means for electrochemically etching grooves in the shaft by passing electrical current through the electrolyte and the shaft so that material is removed from the outer surface of the shaft. In one version, the means for electrochemically etching grooves includes an electrically conductive substrate having an inner surface that corresponds to the outer surface of the shaft. Preferably, the inner surface includes conducting means for passing electrical current from the substrate through the electrolyte to the shaft, the conducting means juxtaposed to areas of the outer surface of the shaft in which the grooves are to be formed. More preferably, the inner surface has an electrically insulating means for substantially preventing electrical current from passing from the substrate through the electrolyte to the outer surface of the shaft in areas other than those in which the grooves are to be formed.

These and various other features as well as advantages which characterize the present invention will be apparent upon reading of the following detailed description and review of the associated drawings.

DETAILED DESCRIPTION OF THE INVENTION

Figure 1:
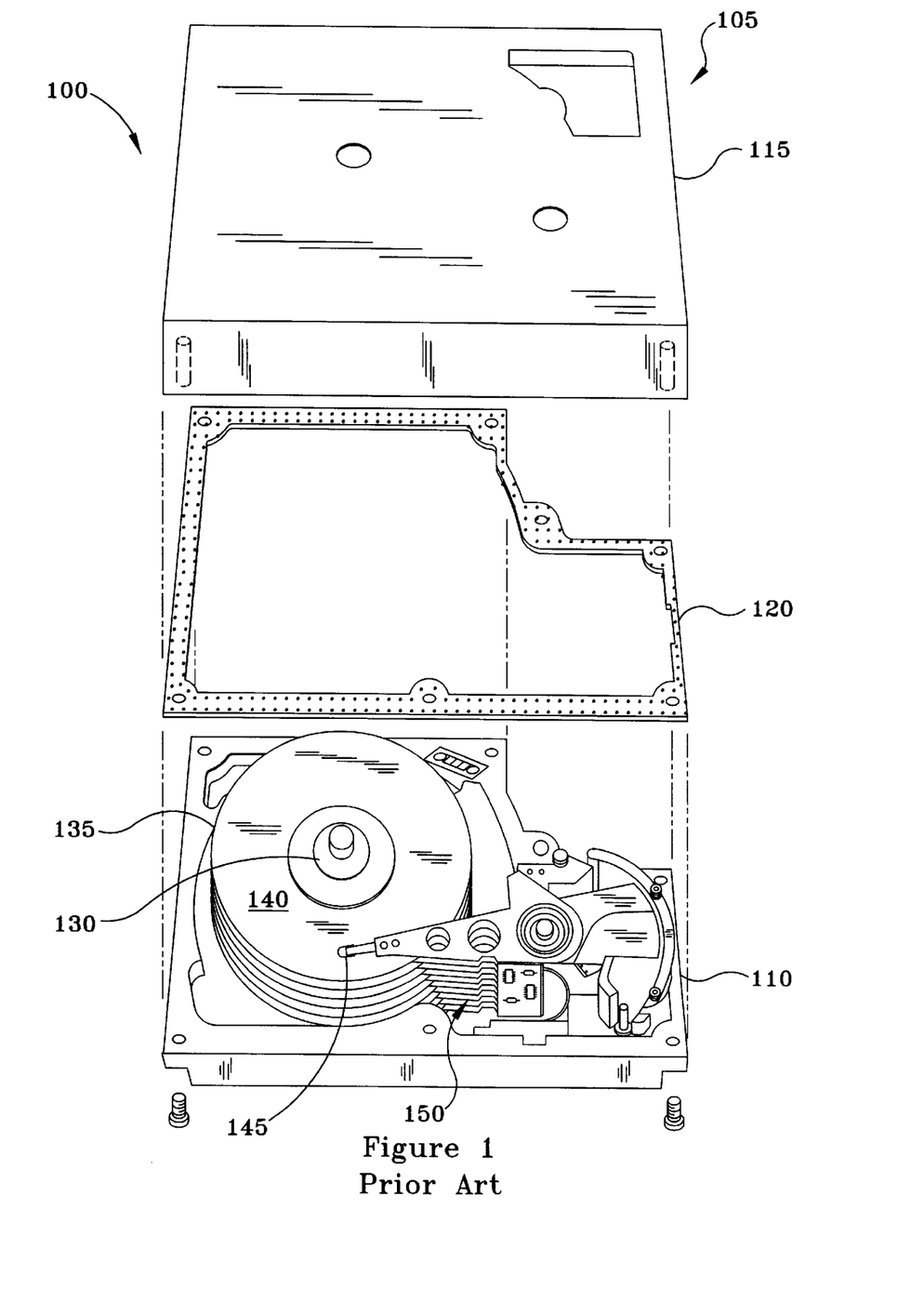
FIG. 1 (prior art) is an exploded perspective view of the basic elements of a disk drive in which a motor incorporating the present invention is especially useful.

FIG. 1 is an exploded perspective view a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, the spindle motor rotates the discs 135 at a high speed past the read/write heads 145 while the suspension arm assembly 150 moves and positions the read/write heads over one of several radially spaced tracks (not shown). This allows the read/write heads 145 to read and write magnetically encoded information to the magnetic media on the surfaces 140 of the discs 135 at selected locations.

Figure 2:
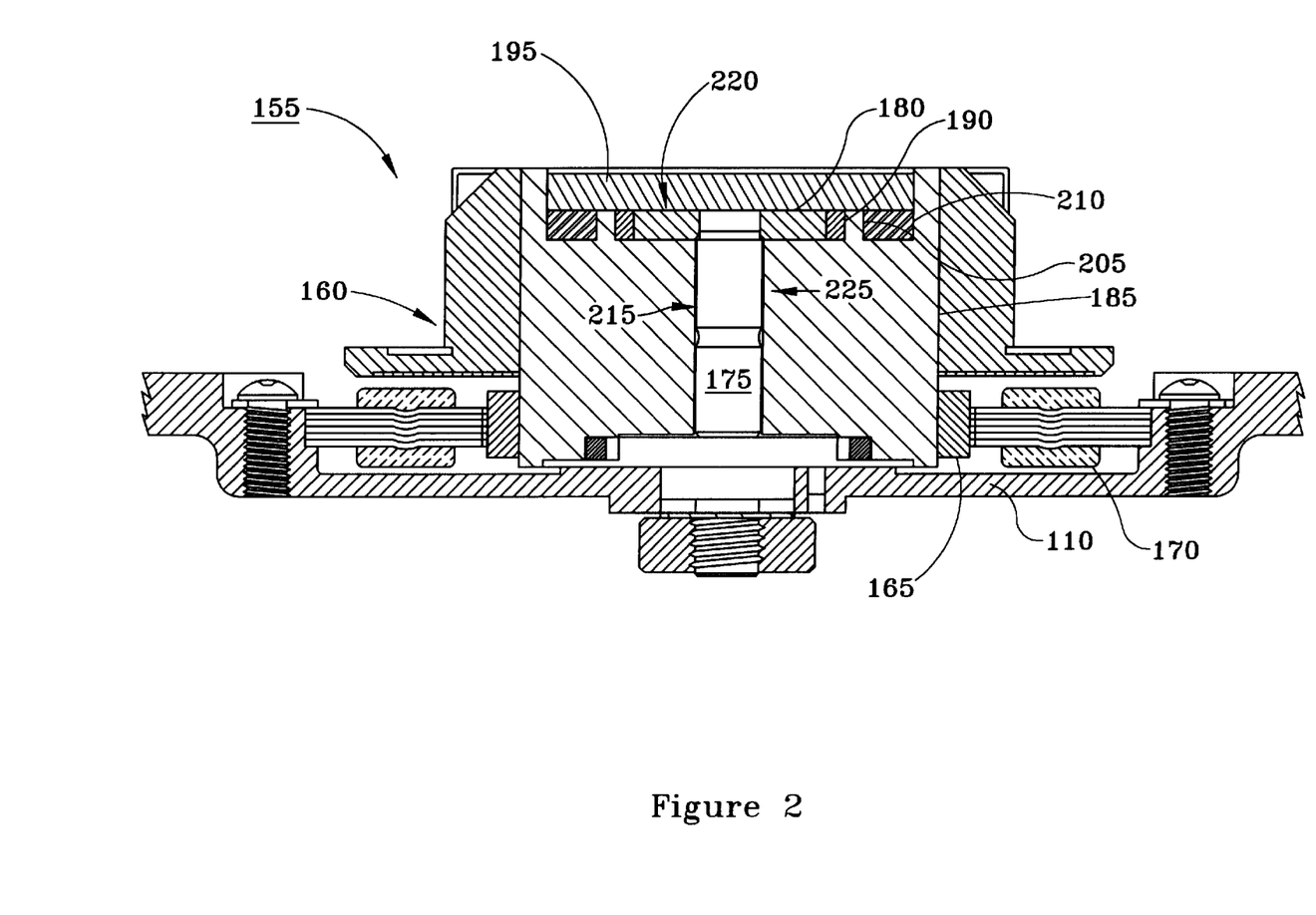
FIG. 2 is a sectional side view of one embodiment of a motor incorporating a shaft having fluid dynamic bearings manufactured by an embodiment of the process of the present invention.

FIG. 2 is a sectional side view of a spindle motor 155 of a type which is especially useful in disc drives 100. Typically the spindle motor 155 includes a rotatable hub 160 having one or more magnets 165 attached to a periphery thereof. The magnets 165 interact with a stator winding 170 attached to the base 110 to cause the hub 160 to rotate. The hub 160 is supported on a shaft 175 having a thrustplate 180 on one end. The thrustplate 180 can be an integral part of the shaft 175, or it can be a separate piece which is attached to the shaft, for example, by a press fit. The shaft 175 and the thrustplate 180 fit into a sleeve 185 and a thrustplate cavity 190 in the hub 160. A counter plate 195 is provided above the thrustplate 180 resting on an annular ring 205 that extends from the hub 160. An O-ring 210 seals the counter plate 195 to the hub 160.

A fluid, such as lubricating oil or a ferromagnetic fluid fills interfacial regions between the shaft 175 and the sleeve 185, and between the thrustplate 180 and the thrustplate cavity 190 and the counter plate 195. One or more of the thrustplate 180, the thrustplate cavity 190, the shaft 175, the sleeve 185 or the counter plate 195 have pressure generating grooves (not shown in this figure) formed in accordance with the present invention to create fluid dynamic bearings 229225. Preferably, grooves are formed in an outer surface 215 of the shaft 175 to facilitate inspection of the grooves. More preferably, the grooves in the outer surface 215 of the shaft 175 form one or more fluid dynamic journal bearings 225 having dynamic cushions that rotatably support the hub 160 in a radial direction.

Figure 3:
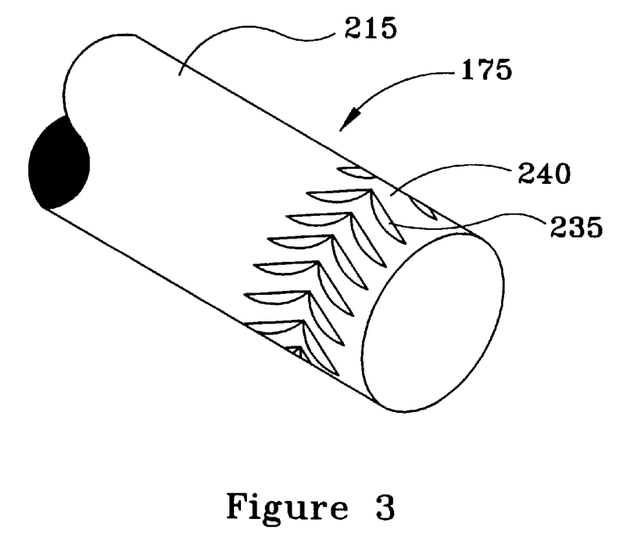
FIG. 3 is a perspective view of an embodiment of a shaft having an inner surface with grooves etched therein by an embodiment of an apparatus and a method of the present invention.
Figure 4:
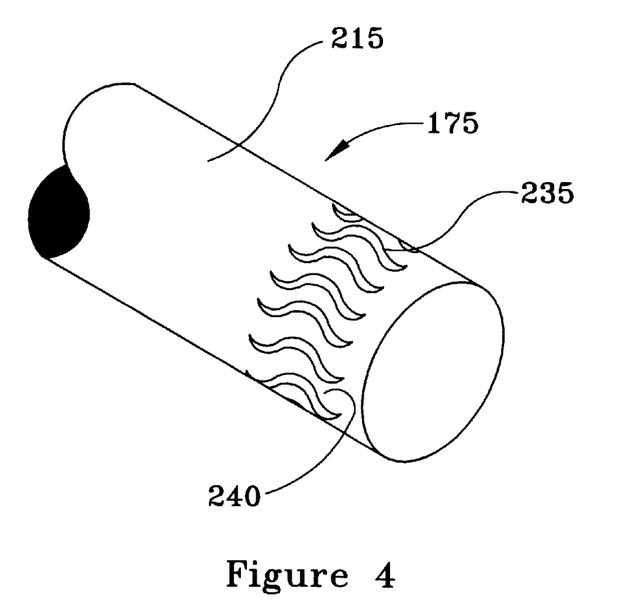
FIG. 4 is a perspective view of another embodiment of a shaft having an inner surface with grooves etched therein by an embodiment of an apparatus and a method of the present invention.

The pressure generating grooves 235 formed in the outer surface 215 of the shaft 175 will now be described with reference to FIG. 3 and FIG. 4. Fluid dynamic bearings, as previously implied, are generally formed between a rotatable and non-rotatable members having juxtaposed surfaces between which a layer or film of fluid is induced to form a dynamic cushion as an anti-friction medium. To form the dynamic cushion, at least one of the surfaces is provided with grooves 235 which induce fluid-flow in the interfacial region and generate the localized region of dynamic high pressure referred to previously. The grooves 235 which are separated by raised lands or ribs 240, can have a depth of from about 0.009 to 0.015 mm. Generally, the grooves 235 are shaped and arranged to form a chevron or herringbone pattern. That is, the grooves 235 are made up of two straight segments, which meet at an angle to define a V shape as shown in FIG. 3. Alternatively, the grooves 235 define a pattern which has an arcuate or sinusoidal shape as shown in FIG. 4. To form a fluid dynamic journal bearing 225, the grooves 235 are configured in a ring about the outer surface 215 of the shaft 175.

Figure 5:
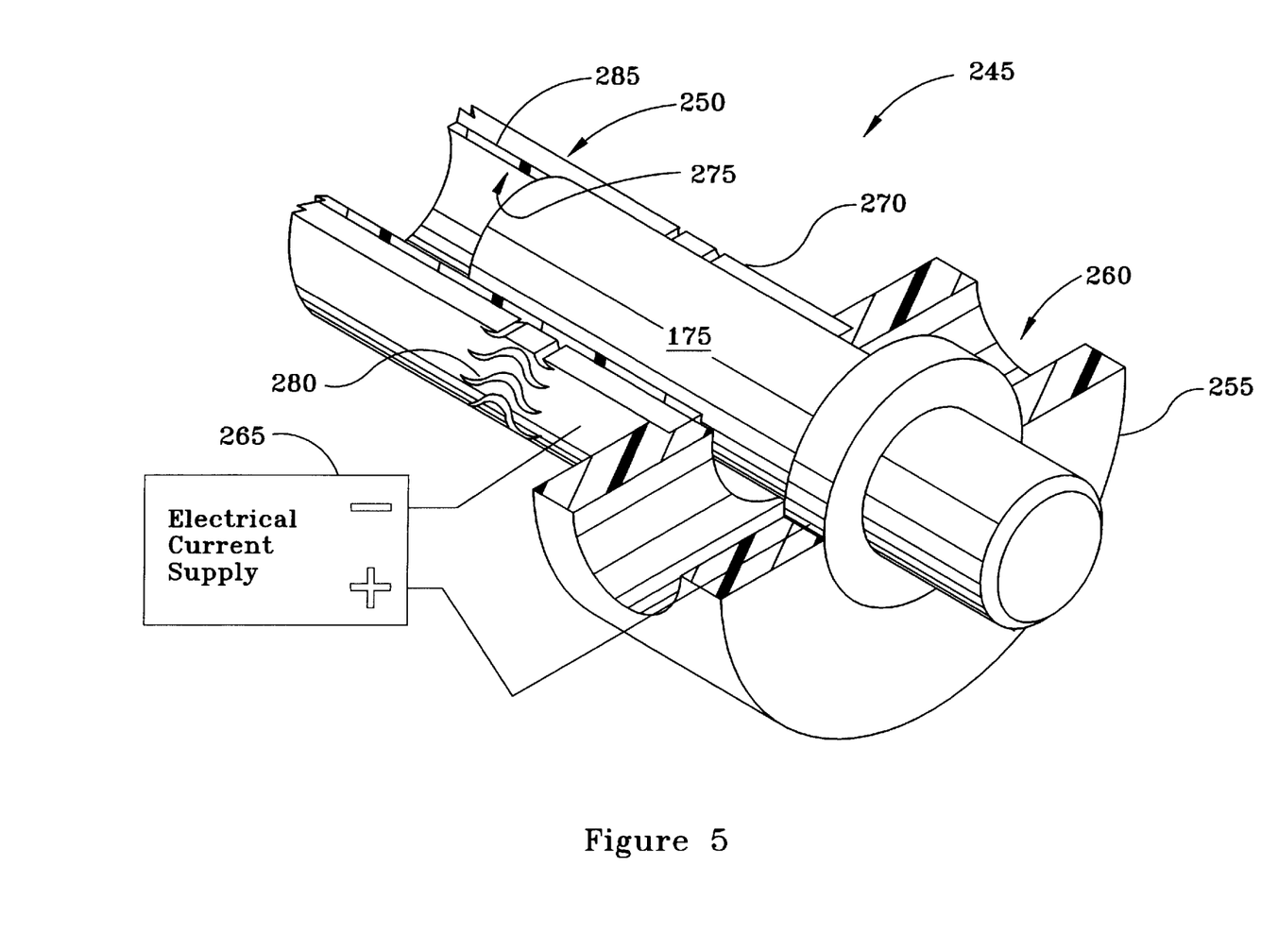
FIG. 5 is a sectional perspective view of an embodiment of an apparatus for etching grooves in an outer surface of a shaft to form a fluid dynamic bearing according to the present invention.

An apparatus 245 for forming grooves 235 in the outer surface 215 of the shaft 175 in accordance with present invention will now be described with respect to FIG. 5. The apparatus 245 generally includes a cathode 250, an electrically insulating body or fixture 255 adapted to hold the shaft 175 within the cathode so that there is substantially no contact between the cathode and outer surface 215 of the shaft, a sealed electrolyte flow-path 260 adapted to flow an electrolyte between the shaft and the cathode, and an electrical current supply 265 coupled to the cathode and the shaft. An electrical current is passed between the cathode 250 and the shaft 175 through the electrolyte to electrochemically machine or etch the outer surface 215 of the shaft.

The cathode 250 has a cylindrical electrically conductive substrate 270 with an inner surface 275 that corresponds to the outer surface 215 of the shaft 175. The inner surface 275 has one or more raised lands 280 and a layer of electrically insulating material 285 between the raised lands. The raised lands 280 are arranged and oriented to remove material from the outer surface 215 of the shaft 175 in areas in which grooves 235 are desired to be formed. The substrate 270 can be made of aluminum, brass, chromium, copper, nickel, steel, stainless steel, tin, zinc or alloys thereof. Preferably, the substrate 270 is made of stainless steel to resist chemical attack and erosion by the electrolyte, and more preferably, the stainless steel is T-303 stainless steel or T-316 stainless steel.

The layer of electrically insulating material 285 prevents electrical current from passing between the substrate 270 and the outer surface 215 of the shaft 175 in areas other than those in which the grooves 235 are to be formed. Thereby, reducing or substantially precluding etching of the outer surface 215 of the shaft 175 in areas corresponding to areas between the raised lands 280. In the embodiment shown in FIG. 5, the electrically insulating material 285 includes a layer sufficiently thick to provide a substantially smooth surface with the raised lands 280. This reduces the erosion of the raised lands 280 which would otherwise be caused by the flow of electrolyte, thereby extending the life of the cathode 250. In one embodiment, the layer of electrically insulating material 285 is made from an organic polymer. Preferably, the organic polymer includes an adhesive to bond to the inner surface of the substrate 270, and more preferably, the organic polymer includes an epoxy resin, such as Ablebond® 400-5 or Ablebond® 293-1T.

Figure 6:
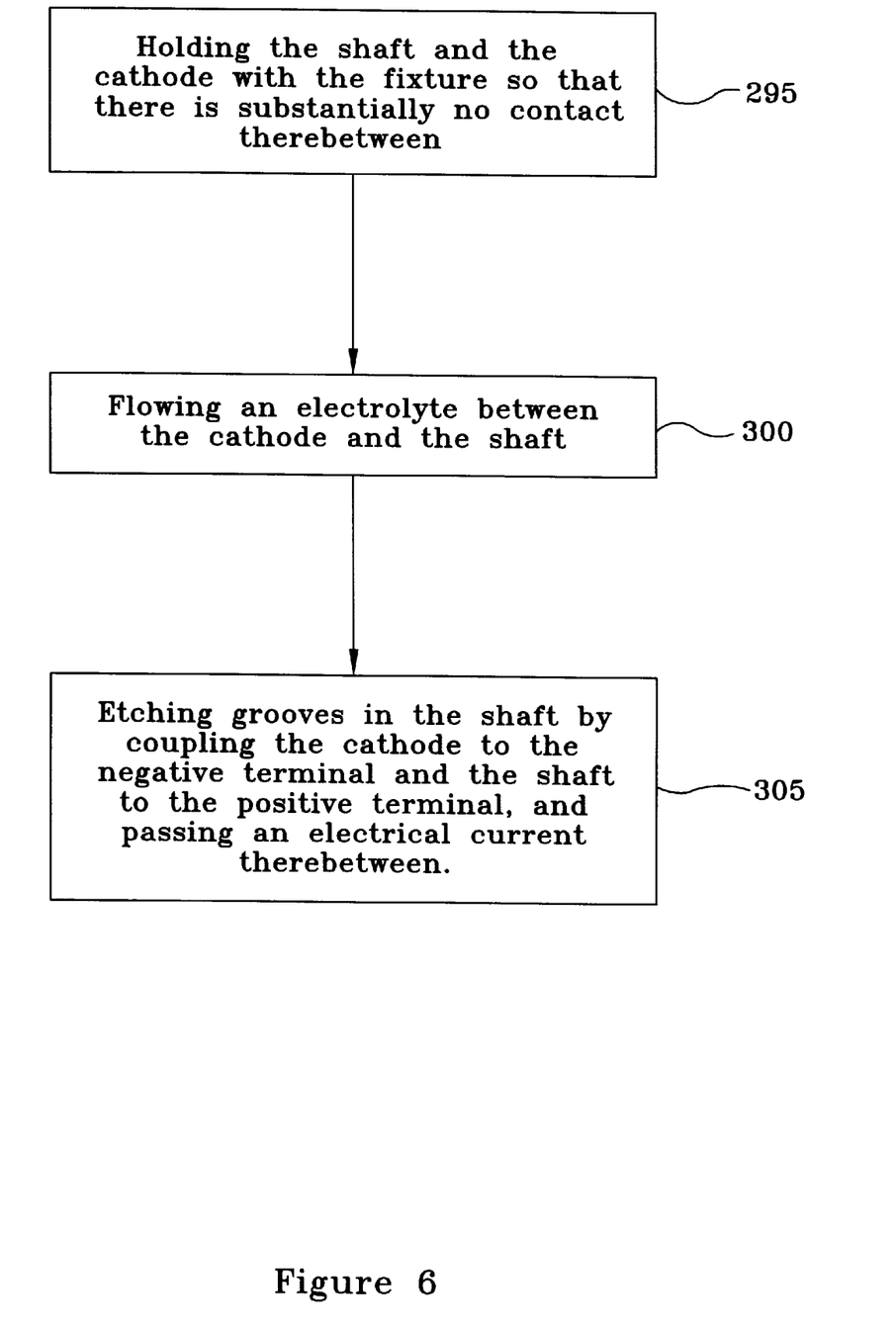
FIG. 6 is a flowchart showing an embodiment of a process for electrochemically etching grooves in an outer surface of a shaft to form a fluid dynamic bearing.

A process of forming grooves 235 in the outer surface 215 of the shaft 175 using the above apparatus 245 will now be described with reference to FIG. 6. FIG. 6 is a flowchart showing a process for electrochemically etching grooves 235 in the outer surface 215 of the shaft 175 according to the present invention. In a setup step 295, the shaft 175 and the cathode 250 are held by the fixture 255 so that there is substantially no contact therebetween. An electrolyte is then allowed to flow between the cathode 250 and the shaft 175 (step 300). The electrolyte is selected depending on the materials of the cathode 250 and the shaft 175, and can include one or more of water, a dilute acid or $NaNO_3$. Next, in an etch step 305 the cathode 250 is coupled to the negative terminal of the electrical current supply 265 and the shaft 175 is coupled to the positive terminal so that an electrical current is passed between the cathode and the shaft. As electrons migrate from the outer surface 215 of the shaft 175 to the cathode 250, metal atoms at the outer surface of the shaft are ionized, breaking metallic bonds and allowing these atoms to be flushed or carried away by the electrolyte. Because of the proximity of the raised lands 280 to the outer surface 215 of the shaft 175, substantially all of the electrical current flow, and consequently substantially all of the etching, occurs at the portions of the outer surface of the shaft immediately adjacent or juxtaposed to the raised lands. Generally, at least 10 $A/cm^2$ is passed between the raised lands 280 and areas of the shaft 175 juxtaposed thereto, and less than 0.1 $A/cm^2$ is passed between the electrically insulating layer 285 and areas of the hub juxtaposed thereto. Thus, grooves 235 are formed in the outer surface 215 of the shaft 175, which are shaped and arranged to correspond to the raised lands 280.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, although the preferred embodiment described herein is directed to an apparatus and method of electrochemically etching grooves to form fluid dynamic bearings for use in a disc drive, it will be appreciated by those skilled in the art that the teachings of the present invention can be applied to other devices using fluid dynamic bearings, without departing from the scope and spirit of the present invention.

What is claimed is:

1. A cathode for electrochemically etching grooves in an outer surface of a shaft to form a fluid dynamic bearing, the cathode comprising:
   (a) an electrically conductive cylindrical substrate having an inner surface that corresponds to the outer surface of the shaft, the inner surface comprising a plurality of raised lands corresponding to the grooves to be formed in the shaft; and
   (b) a layer of electrically insulating material covering the inner surface of the substrate between the plurality of raised lands to substantially preclude etching of the outer surface of the shaft in areas corresponding to areas between the plurality of raised lands.

2. A cathode according to claim 1, wherein the plurality of lands are shaped and arranged on the inner surface of the substrate to etch a pattern of grooves in the outer surface of the shaft, and wherein the pattern is a herringbone pattern or an arcuate pattern.

3. A cathode according to claim 2, wherein the plurality of lands are arranged on the inner surface of the substrate so that the patter of grooves etched in the outer surface of the shaft form a plurality of fluid dynamic bearings.

4. A cathode according to claim 1, wherein the layer of electrically insulating material comprises a layer sufficiently thick to form a substantially smooth surface with the plurality of raised lands.

5. A cathode according to claim 1, wherein the layer of electrically insulating material comprises an organic polymer bonded to the inner surface of the substrate.

6. A cathode according to claim 1, wherein substrate comprises stainless steel.

7. A method of electrochemically etching grooves in an outer surface of an electrically conductive shaft to form a fluid dynamic bearing, the method comprising steps of:
   (a) providing a cathode;
   (b) attaching a fixture to the cathode, the fixture adapted to hold the shaft within the cathode so that there is substantially no contact between the cathode and the shaft;
   (c) flowing an electrolyte between the cathode and the shaft;
   (d) coupling the cathode and the shaft to an electrical current supply; and
   (e) passing electrical current between the cathode and the shaft to remove material from the outer surface of the shaft.

8. A method according to claim 7, wherein step (a) comprises the step of providing an electrically conductive cylindrical substrate with an inner surface that corresponds to the outer surface of the shaft, the inner surface comprising a plurality of raised lands corresponding to the grooves to be formed in the shaft and a layer of electrically insulating material between the plurality of raised lands.

9. A method according to claim 8, wherein step (e) comprises the step of passing electrical current through the plurality of raised lands to remove material from the outer surface of the shaft in areas corresponding to the plurality of raised lands.

10. A method according to claim 1, wherein the step of providing a cathode further comprises the step of providing a cathode wherein each of the plurality of lands is adapted to etch a pattern of grooves in the outer surface of the shaft, and wherein the pattern is a herringbone pattern or an arcuate pattern.

11. A method according to claim 1, wherein the step of providing a cathode further comprises the step of providing a cathode having lands arranged on the inner surface of the substrate so that the pattern of grooves etched in the outer surface of the shaft form a plurality of fluid dynamic bearings.

12. An apparatus for electrochemically etching grooves in an outer surface of an electrically conductive shaft to form a fluid dynamic bearing, the apparatus comprising:
   (a) a cathode comprising an electrically conductive cylindrical substrate having an inner surface that corresponds to the outer surface of the shaft, the inner surface comprising a plurality of raised lands and a layer of electrically insulating material between the plurality of raised lands;
   (b) a fixture adapted to hold the shaft within the cathode so that there is substantially no contact between the cathode and the shaft;

(c) a sealed electrolyte flow-path to flow an electrolyte between the cathode and the shaft; and (d) an electrical current supply coupled to the cathode and the shaft to pass electrical current therebetween so that material is removed from the outer surface of the shaft in areas corresponding to the plurality of raised lands.

13. An apparatus according to claim 12, wherein the plurality of lands are shaped and arranged on the inner surface of the substrate to etch a pattern of grooves in the outer surface of the shaft, and wherein the pattern is a herringbone pattern or an arcuate pattern.

14. An apparatus according to claim 13, wherein the plurality of lands are arranged on the inner surface of the substrate so that the pattern of grooves etched in the outer surface of the shaft form a plurality of fluid dynamic bearings.

15. An apparatus according to claim 12, wherein the layer of electrically insulating material comprises a layer sufficiently thick to form a substantially smooth surface with the plurality of raised lands.

16. An apparatus for electrochemically etching grooves in an outer surface of an electrically conductive shaft to form a fluid dynamic bearing, the apparatus comprising:

(a) means for holding the shaft;

(b) means for flowing an electrolyte over the outer surface of the shaft; and (c) means for electrochemically etching grooves in the shaft by passing electrical current through the electrolyte and the shaft so that material is removed from the outer surface of the shaft.

17. An apparatus according to claim 16, wherein the means for electrochemically etching grooves comprises an electrically conductive cylindrical substrate having an inner surface that corresponds to the outer surface of the shaft.

18. An apparatus according to claim 17, wherein the inner surface comprises a plurality of conducting means for passing electrical current from the substrate through the electrolyte to the shaft, the conducting means juxtaposed to areas of the shaft in which the grooves are to be formed.

19. An apparatus according to claim 18, wherein the inner surface further comprises an electrically insulating means for substantially preventing electrical current from passing from the substrate through the electrolyte to the shaft in areas other than those in which the grooves are to be formed.

20. An apparatus according to claim 17, wherein the means for holding the shaft comprises an electrically insulating body, and wherein the electrically insulating body is adapted to hold the shaft within the substrate so that there is substantially no contact between the substrate and the shaft.

* * * * *